H. M. HARTMAN.
PNEUMATIC TIRE AND CLAMPING MEANS.
APPLICATION FILED FEB. 28, 1908.
927,793.
Patented July 13, 1909.
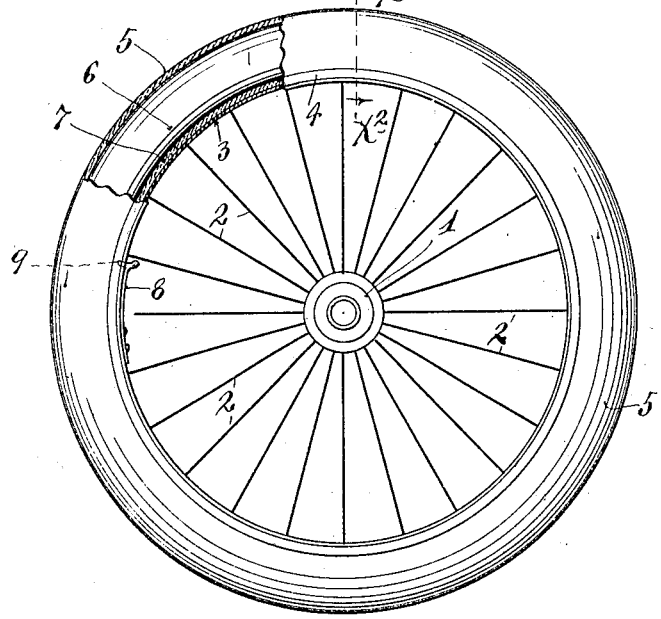
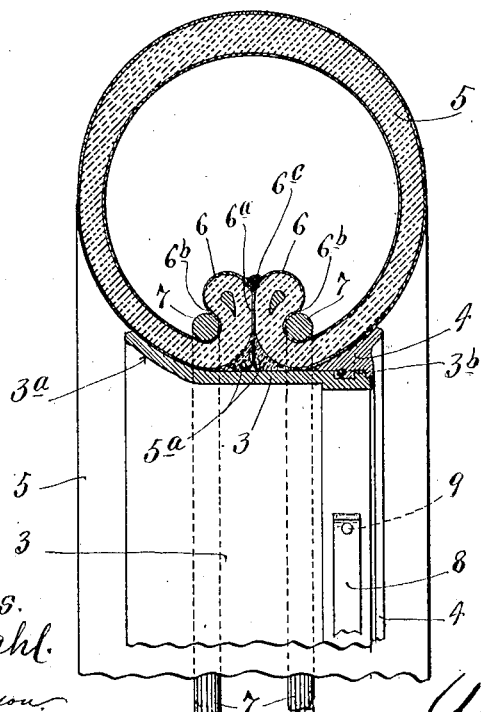
Witnesses.
A. H. Opsahl.
L. L. Simpson.
Inventor.
Harvey M. Hartman
By his Attorneys
Williamson Merchant

UNITED STATES PATENT OFFICE.

HARVEY M. HARTMAN, OF MINNEAPOLIS, MINNESOTA, ASSIGNOR OF ONE-HALF TO OSCAR P. HANSON, OF MINNEAPOLIS, MINNESOTA.

PNEUMATIC TIRE AND CLAMPING MEANS.

No. 927,793.  Specification of Letters Patent.  Patented July 13, 1909.

Application filed February 28, 1908. Serial No. 418,358.

*To all whom it may concern:*

Be it known that I, HARVEY M. HARTMAN, a citizen of the United States, residing at Minneapolis, in the county of Hennepin and State of Minnesota, have invented certain new and useful Improvements in Pneumatic Tires and Clamping Means; and I do hereby declare the following to be a full, clear, and exact description of the invention, such as will enable others skilled in the art to which it appertains to make and use the same.

My invention has for its object to provide an improved pneumatic tire, and to the above ends the invention consists of the novel devices and combinations of devices hereinafter described and defined in the claim.

In the accompanying drawings which illustrate the invention, like characters indicate like parts throughout the several views.

Referring to the drawings, Figure 1 is a view in side elevation, with some parts broken away and some parts sectioned, showing a wheel, such as an automobile wheel or a bicycle wheel, and illustrating my invention applied thereto; and Fig. 2 is an enlarged section, taken on the line $x^2$ $x^2$ of Fig. 1.

Of the parts of the wheel, the numeral 1 indicates the hub, the numeral 2 the spokes and the numeral 3 the wheel rim proper, the latter being, of course, secured to the outer ends of the spokes in the usual or any suitable way. In accordance with my invention this rim 3, at one side, is provided with an outwardly curved flange or flaring portion $3^a$; and, at its other edge, it is provided with spiral threads $3^b$ that engage with the correspondingly formed threads of a detachable clamping ring 4. The face of this clamping ring 4 is of such curved contour in cross section that it coöperates with the flaring portion $3^a$ and the body 3 of the wheel rim to form a transversely concaved channel, adapted to receive and fit the inner portion of the tire 5 and to hold the latter against lateral displacement when said tire is inflated.

The tire 5 is a split tire or tube having, at its edges, inwardly extended edge folds 6 formed with abutting approximately straight surfaces $6^a$. The tire 6 is constructed chiefly of canvas but is internally and externally covered with rubber. The outer rubber covering at the lower portions of the straight surfaces $6^a$ are thickened up to form approximately triangular joint strips $5^a$ which, of course, are endless and extend circumferentially of the tire. The canvas portions of the edge folds have the greatest cross section at their extreme inner edges; and, in fact, diminish in cross section approximately to the points where they bear against the wheel rim. Immediately below their thickened inner edges they are undercut or slightly grooved to form annular seats $6^b$ that are adapted to receive, in whole or in part, metal clamping hoops or rings 7. Also as preferably constructed, one of the edge folds has a small rubber or pliable sealing flap $6^c$ that is arranged to be seated against the other edge fold 6 by air pressure from within the tire.

When the tire is deflated and the clamping ring 4 is removed from the rim 3, the tire may be very easily placed in working position on said rim or removed therefrom, together with the hoops 7, which latter may all the time remain seated within the tire. When the tire is placed in working position, as shown in Fig. 2, and the clamping ring 4 is screwed onto the rim 3 and the tire is then inflated, the edge folds 6 will be tightly pressed together and will be forced against the rim with a clamping or wedge action, which insures an air-tight joint between the said parts, and, hence, cause the air pressure from within the tire to react against the same and force the folds 6 together and against the tire. It is, of course, evident that the inner portion of the tire being thus held against expansion by the hoops cannot move laterally off from the expanded or enlarged edge portions of the wheel rim.

The expanding stress on the tire, due to the compressed air contained therein, of course tends to pull the edge folds of the tire outward from under the retaining hoops 7, but as the said hoops cannot separate, to any perceptible extent, and as the canvas portions of the tire have inwardly increasing cross section, such expanding strain is simply caused to wedge the edge folds of the tire more tightly together and against the wheel rim. Furthermore, the rubber joint strips $5^a$ very greatly assist in forming a tight joint between the tire and the wheel rim 3. The sealing flap 6ᶜ assists in closing the joint between the edge folds of the tire, especially when the tire is receiving its initial charge.

To lock the clamping ring 4 in working position on the rim 3 and, hence, against accidental displacement, I preferably provide a latch device in the form of a leaf spring 8, one end of which is secured to the rim 3. At its free end, this spring latch 8 is provided with a pin or lug 9 that works through a perforation in said rim and is adapted to engage with a perforation in said clamping ring 4.

The improved tire above described is capable of application to almost any kind of a channel-shaped rim, but is especially adapted for application to a detachable rim, that is, to a rim having one or more detachable side flanges.

What I claim is:

The combination with a concave wheel rim provided with a detachable flange of a split pneumatic tire formed with edge folds 6 adapted to be brought together adjacent to said rim and having approximately flat surfaces 6ᵃ and pliable joint strips 5ᵃ formed as a part of the tire, the said flanges 6 being formed with under-cut annular seats 6ᵇ, and hoops 7 in said tire engaging said seats 6ᵇ and serving to hold the inner edge folds of said tire in contact with each other and with the wheel rim, substantially as described.

In testimony whereof I affix my signature in presence of two witnesses.

HARVEY M. HARTMAN.

Witnesses:
H. D. KILGORE,
F. D. MERCHANT.